(12) United States Patent
Kim et al.

(10) Patent No.: US 11,223,114 B2
(45) Date of Patent: Jan. 11, 2022

(54) ANTENNA SYSTEM FOR A VEHICLE TELEMATICS UNIT

(71) Applicant: Harman International Industries, Incorporated, Stamford, CT (US)

(72) Inventors: Jinu Kim, Seoul (KR); Hao Xu, Shanghai (CN); Hao Liu, Fremont, CA (US); Lilly Luk, Palo Alto, CA (US); Ram Iyer, San Francisco, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/728,974

(22) Filed: Dec. 27, 2019

(65) Prior Publication Data

US 2021/0203066 A1 Jul. 1, 2021

(51) Int. Cl.
*H01Q 1/32* (2006.01)
*B60C 23/04* (2006.01)
*B60R 21/01* (2006.01)
*G07C 5/08* (2006.01)
*H01Q 1/22* (2006.01)

(52) U.S. Cl.
CPC ....... *H01Q 1/3291* (2013.01); *B60C 23/0452* (2013.01); *B60R 21/01* (2013.01); *G07C 5/0808* (2013.01); *H01Q 1/2283* (2013.01); *B60R 2021/01088* (2013.01); *B60R 2300/8066* (2013.01); *H04Q 2209/00* (2013.01); *H04Q 2209/823* (2013.01)

(58) Field of Classification Search
CPC ............... H01Q 1/3291; H01Q 1/2283; B60C 23/0452; B60R 21/01; B60R 2021/01088; B60R 2300/8066; G07C 5/0808; H04Q 9/00; H04Q 2209/00; H04Q 2209/10; H04Q 2209/40; H04Q 2209/80; H04Q 2209/82; H04Q 2209/823
See application file for complete search history.

(56) References Cited

U.S. PATENT DOCUMENTS

| | | | |
|---|---|---|---|
| 6,275,194 B1 * | 8/2001 | Ansorge | H01Q 1/10 343/713 |
| 6,972,726 B2 * | 12/2005 | Sato | H01Q 1/243 343/725 |
| 8,583,199 B2 * | 11/2013 | Wisnewski | H04W 24/04 455/575.9 |

(Continued)

FOREIGN PATENT DOCUMENTS

| | | |
|---|---|---|
| CN | 205665742 U | 10/2016 |
| EP | 3567671 A1 | 11/2019 |
| RU | 2142181 C1 | 11/1999 |

OTHER PUBLICATIONS

Rospatent Federal Service for Intellectual Property, Office Action Issued in Application No. 2020142741/07(079568), dated Sep. 8, 2021, 11 pages.

*Primary Examiner* — Franklin D Balseca
(74) *Attorney, Agent, or Firm* — McCoy Russell LLP

(57) ABSTRACT

Embodiments are disclosed for an example telematics system for a vehicle. The example telematics system comprises a plurality of antennae capable of sending and receiving wireless signals, the plurality of antennae including a primary antenna and a backup antenna positioned adjacent to the primary antenna. The primary antenna comprises a three-dimensional antenna, and the backup antenna comprises a two-dimensional antenna.

20 Claims, 7 Drawing Sheets

(56) References Cited

U.S. PATENT DOCUMENTS

| | | | |
|---|---|---|---|
| 9,065,177 B2 * | 6/2015 | Alexopoulos | H01Q 1/48 |
| 9,083,414 B2 * | 7/2015 | Basnayake | H04B 7/0413 |
| 9,306,277 B2 * | 4/2016 | Miyake | H01Q 1/48 |
| 9,385,433 B2 * | 7/2016 | Stoytchev | H01Q 5/364 |
| 9,493,132 B2 * | 11/2016 | Kawada | G08B 25/016 |
| 10,363,904 B1 | 7/2019 | Chim et al. | |
| 10,559,982 B2 * | 2/2020 | Zeine | H04B 7/0613 |
| 10,594,362 B2 * | 3/2020 | Murakami | H01Q 21/28 |
| 10,601,461 B1 * | 3/2020 | Eaton | G01S 19/36 |
| 10,615,530 B2 * | 4/2020 | Frank | H01R 24/86 |
| 10,616,904 B1 * | 4/2020 | Mirkamali | H01Q 21/12 |
| 10,623,239 B1 * | 4/2020 | Li | H04B 17/382 |
| 2007/0236404 A1 * | 10/2007 | Snider | H01Q 1/3233 |
| | | | 343/872 |
| 2010/0164790 A1 | 7/2010 | Wisnewski et al. | |
| 2012/0258705 A1 | 10/2012 | Wisnewski et al. | |

\* cited by examiner

ANTENNA SYSTEM FOR A VEHICLE TELEMATICS UNIT

FIELD

The disclosure relates to the field of vehicle communication systems, and in particular to antenna systems for an integrated telematics unit.

BACKGROUND

Emergency assistance systems are known for transmitting vehicle information in the event of an impact. These systems are designed such that upon detecting an impact situation, a telephone call or SMS message may be initiated to a base station. The emergency system sends vehicle information, such as vehicle crash data, vehicle identification, vehicle condition, and vehicle location information to the base station. Thus, emergency units such as ambulances and/or police may be automatically called in the event of an impact. However, if the antenna of the emergency system is damaged during the impact, the emergency system may not be capable of automatically transmitting such an automatic emergency call.

SUMMARY

Embodiments are disclosed for an example telematics system for a vehicle. The example telematics system comprises a plurality of antennae capable of sending and receiving wireless signals, the plurality of antennae including a primary antenna and a backup antenna positioned adjacent to the primary antenna.

In another embodiment, a telematics system for a vehicle comprises an antenna system comprising a three-dimensional primary antenna and a two-dimensional backup antenna positioned adjacent to the primary antenna, the antenna system capable of wirelessly sending and receiving data packets in accordance with a cellular communication protocol. The telematics system further comprises a processor communicatively coupled to the antenna system, and a storage device storing instructions executable by the processor to: generate an emergency alert responsive to detecting alert conditions; determine whether the primary antenna is functional; transmit the emergency alert via the primary antenna and the backup antenna if the primary antenna is functional; and transmit the emergency alert via the backup antenna if the primary antenna is not functional.

Methods for a vehicle telematics system are also disclosed. An example method for a telematics system for a vehicle comprises generating an emergency alert responsive to detecting alert conditions, determining whether a primary antenna of the telematics system is functional, transmitting the emergency alert via the primary antenna and a backup antenna of the telematics system positioned adjacent to the primary antenna if the primary antenna is functional, and transmitting the emergency alert via the backup antenna if the primary antenna is not functional.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
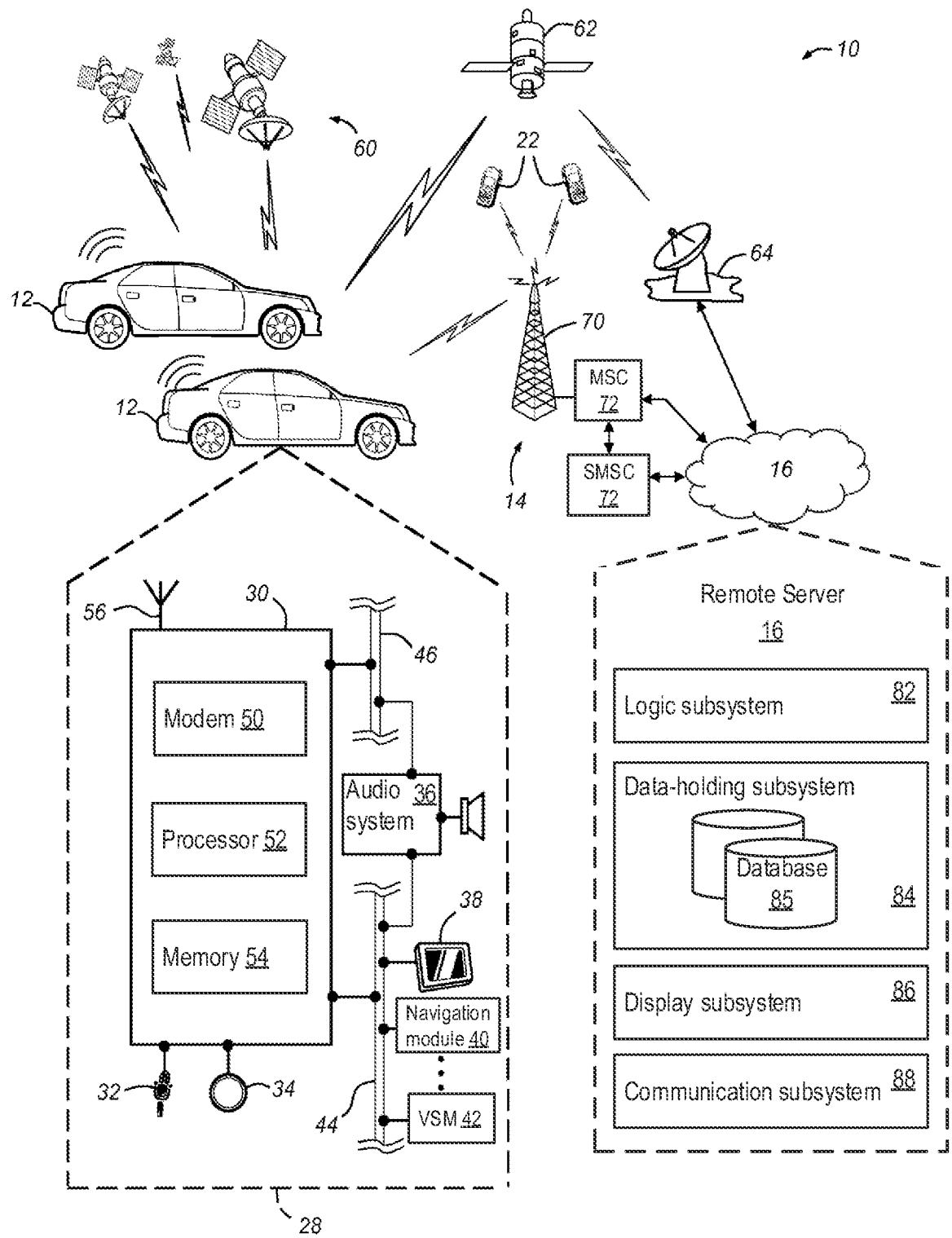
FIG. 1 shows a schematic depicting an example inter-vehicle communications system in accordance with one or more embodiments of the present disclosure.

As described above, telematics systems are used to provide telecommunications and cellular connectivity for vehicles, and may further be configured to generate emergency calls in the event of an impact or accident. The present disclosure describes a telematics system for a vehicle that establishes communication between the vehicle and other vehicles in the same or similar geographic area or external services via a relay tower or base station. A communications system, such as the system depicted in FIG. 1, shows one such example of a system capable of providing communication between a vehicle and external services. In the event of one or more of an impact, accident, mechanical failure, electrical failure, and/or medical emergency, an assistance request may be broadcast to nearby vehicles or external services via relay towers and/or satellites.

Further, as described herein, the telematics unit may include a plurality of antennae, including at least one primary antenna and at least one backup antenna, and a controller such as an electronic control unit (ECU) integrated therein. In contrast, previous telematics systems were not integrated and relied on coaxial cables for connecting the ECU and antennas which may be positioned at various locations throughout a vehicle. The integrated telematics unit of the present disclosure provides an all-in-one solution by high integration of multiple antennae into one package, whereas traditional designs only supported a limited number of antennae. Further, the integrated telematics unit of the present disclosure provides an aerodynamic improvement for a vehicle configured with the telematics unit as well as additional crash protection for the telematics unit, as the primary antenna is integrated inside the vehicle rather than being provided as a sharkfin antenna protruding from the roof of the vehicle. This advantage further enables a stealthier design and more flexibility to vehicle designers (e.g., glass roofs) as the positioning of the primary antenna is not limited to an external mounting position. The integrated telematics unit of the present disclosure further enables reduced assembly efforts, as mounting a single antenna module saves time in the production line by reducing installation or production steps. Material savings are also obtained, as all antennae are mounted in one place, thereby eliminating the number of cables routed through the vehicle in previous systems. Cost savings are also obtained via easier handling of spare parts and servicing. The $CO_2$ footprint is also improved by saving the length of antenna cabling and not individually installing (e.g., housing, mounting, and so on) each antenna, thereby reducing weight and improving the $CO_2$ footprint.

With reference to FIG. 1, there is shown an exemplary operating environment that comprises an inter-vehicle communications system 10 that can be used to implement the methods disclosed herein. Inter-vehicle communications system 10 generally includes one or more telematics-equipped vehicles 12, one or more wireless carrier systems 14, and one or more remote servers 16. In some examples, the inter-vehicle communications system 10 may additionally include various personal wireless devices 22, and a short message service center (SMSC) 24. It should be understood that the method disclosed below with reference to FIG. 7, can be used with any number of different systems and is not specifically limited to the operating environment shown here. Thus, the following paragraphs simply provide a brief overview of one possible configuration for providing wireless communication between each of the vehicles 12, and between the vehicles 12 and remote servers 16. However, it should be appreciated that other systems not shown here could be employed to execute the disclosed methods as well.

Vehicles 12 are depicted in the illustrated embodiment as passenger cars, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1. More detailed depictions of example vehicle electronics which may be included in vehicles 12 are shown below with reference to FIGS. 2-6. The vehicle electronics 28 may include one or more of a telematics unit 30, a microphone 32, one or more pushbuttons or other control inputs 34, an audio system 36, a visual display 38, and a navigation module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed or aftermarket device that enables vehicles 12 to receive and/or transmit wireless signals corresponding to voice, text, and/or other data. Thus, telematics unit 30 may send and/or receive wireless signals (e.g., electromagnetic waves) such as Wifi, Bluetooth, radio, cellular, and so on. Telematics unit 30 may therefore be referred to as transceiver 30, since it may be capable of both sending and receiving wireless signals. Wireless signals produced by the telematics unit 30 of vehicles 12 may be sent to and received by one or more of the vehicles 12 and remote servers 16. Thus, each of the vehicles 12 may be in wireless communication with one another for sending and/or receiving information there-between via the telematics unit 30. Further, each of the vehicles 12 may be in wireless communication with the remote servers 16 for sending and/or receiving information there-between.

In some examples, where one of the vehicles 12 is in need of assistance (e.g., impact, accident, mechanical/electrical failure, medical emergency, and so on) an assistance request may be wirelessly broadcast to other vehicles within the vicinity of the vehicle in need of assistance. If wireless communication between the vehicle in need of assistance and the remote servers 16 is disrupted, then the vehicle in need of assistance may broadcast an assistance request via the telematics unit 30. However, in other examples, where wireless communication is established between the vehicle in need of assistance and the remote server 16, the vehicle in need of assistance may send an assistance request to the remote servers 16. The remote servers 16 may then send an assistance request to one or more of the vehicles 12 within a threshold distance of the vehicle in need of assistance and/or may notify one or more of medical services (e.g., ambulances), tow services, public safety services, and so on, depending on the type of emergency of the vehicle in need of assistance.

Wireless communication between the remote servers 16 and the vehicles 12 may be maintained even at greater distances between the servers 16 and the vehicles 12 by including relay towers 70. Each of the towers 70 may include sending and receiving antennae for relaying wireless signals between the remote servers 16 and the vehicles 12.

However, it should be appreciated that in some examples, relay towers 70 may not be included in the communications system 10, and that the vehicles 12 may be in direct wireless communication with the remote servers 16. Further, if one or more of the vehicles 12 are separated from the remote server 16 by a sufficient distance, and/or terrain (e.g., mountains) blocks the wireless signal from being transmitted therebetween, then the one or more vehicles 12 may not be in wireless communication with the servers 16.

Additionally or alternatively, communications system 10 may utilize satellite communications to provide uni-directional or bi-directional communication between one or more of the vehicles 12 and the remote servers 16. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Further, in some examples, each of the vehicles 12 may wirelessly transmit information to the satellite 62, which broadcasts the information to the servers 16.

As such, each of the vehicles 12 may communicate with one or more of remote server 16, other telematics-equipped vehicles 12, or some other entity or device capable of transmitting and/or receiving wireless signals. Telematics unit 30 enables the vehicle to offer a number of different services including those related to messaging, navigation, telephony, emergency assistance, diagnostics, infotainment, and so on. Data can be sent over a data connection, such as via a packet switching connection, or via a voice channel using techniques already known in the art. For combined services that involve both voice communication and data communication, the system can utilize a single call over a voice channel and switch as needed between voice and data transmission over the voice channel, and this can be done using techniques known to those skilled in the art.

According to one embodiment, telematics unit 30 utilizes a wireless modem 50 for data transmission, an electronic processing device 52, one or more digital memory devices 54, and one or more antennae 56. It should be appreciated that the modem can either be implemented through software or it can be a separate hardware component located internal or external to telematics unit 30. The modem can operate using any number of different standards or protocols such as EVDO, CDMA, GPRS, and EDGE. Wireless networking between the vehicles 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet switching data communication such as TCP/IP, the telematics unit 30 can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit 30 to provide a wide variety of services. For instance, processor 52 can execute programs or process data to carry out at least a part of the methods discussed herein.

Telematics unit 30 can be used to provide a diverse range of vehicle services that involve wireless communication to and from the vehicles 12. Such services can include: remote control of certain vehicle features through the use of VSMs 42; turn-by-turn directions and other navigation-related services provided in conjunction with the navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the exemplary telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicles 12, to cite but a few possibilities. In the event that the modules are implemented as VSMs 42 located external to telematics unit 30, they could utilize communications bus 44 to exchange data and commands with the telematics unit 30.

In some examples, the antennae 56 of the telematics unit 30 includes a primary antenna configured as the primary communication link to base stations of the relay towers 70, as well as a backup antenna configured to enable an emergency call or an e-call in case the primary antenna is damaged. In typical arrangements of primary and backup antennae, the primary antenna is configured as a whip- or shark-fin type antenna on the rear portion of the rooftop of the vehicle 12, in proximity to the rear windshield of the vehicle 12 for example, while the backup antenna is typically mounted within the vehicle 12 away from the primary antenna. However, such an arrangement requires the use of coaxial cables to connect the primary antenna and backup antenna to the telematics unit 30. As discussed further herein with regard to FIGS. 4-6, an improved arrangement for the telematics unit 30 includes a primary antenna and a backup antenna integrated into the telematics unit 30.

Navigation module 40 may be configured to support any suitable navigation system such as GPS, GALILEO, GLONASS, IRNSS, etc. In examples, where the navigation module 40 is a GPS navigation module, the module 40 receives signals from a constellation of GPS satellites 60. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of navigation module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to remote servers 16, for other purposes, such as fleet management.

Apart from the audio system 36 and navigation module 40, the vehicles 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests and perform other functions. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks. According to one embodiment, the ECM is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicles 12, as numerous others are also possible.

Vehicle electronics 28 may also include a number of vehicle user interfaces that provide vehicle occupants with a means of providing and/or receiving information, such as microphone 32, pushbuttons(s) 34, audio system 36, and visual display 38. As used herein, the term 'vehicle user interface' broadly includes any suitable form of electronic device, including both hardware and software components, which is located on the vehicles 12 and enables a vehicle user to communicate with or through a component of the vehicles 12. In the description herein a vehicle user may also be referred to simply as a user, and/or a vehicle operator. Microphone 32 provides audio input to the telematics unit 30 to enable the driver or other occupant to provide voice commands and carry out hands-free calling. For this purpose, it can be connected to an on-board automated voice processing unit utilizing human-machine interface (HMI) technology known in the art. The pushbutton(s) 34 allow manual user input into the telematics unit 30 to provide data, response, or control input. Separate pushbuttons can be used for initiating emergency calls versus regular service assistance calls. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel, a pop-up visual display, or a heads-up display reflected off of the windshield, and can be used to provide a multitude of input and output functions. Various other vehicle user interfaces can also be utilized, as the interfaces of FIG. 1 are only an example of one particular implementation.

Remote servers 16 may be a computing device configured to: generate a user personalized grade for a medication, and calculate medication costs from claims data. In one example, the user personalized grade may be related to the predicted effectiveness of the medication. Further the user personalized grade may be based on one or more of available scientific research, clinical studies, patient reviews, care provider recommendations, etc. In different embodiments, remote servers 16 may take the form of a mainframe computer, server computer, desktop computer, laptop computer, tablet computer, home entertainment computer, network computing device, mobile computing device, mobile communication device, gaming device, etc.

Remote servers 16 may include a logic subsystem 82 and a data-holding subsystem 84. Remote servers 16 may optionally include a display subsystem 86, communication subsystem 88, and/or other components not shown in FIG. 2. For example, remote servers 16 may also optionally include user input devices such as keyboards, mice, game controllers, cameras, microphones, and/or touch screens.

Logic subsystem 82 may include one or more physical devices configured to execute one or more instructions. For example, logic subsystem 82 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 82 may include one or more processors that are configured to execute software instructions. Additionally or alternatively, the logic subsystem 82 may include one or more hardware or firmware logic machines configured to execute hardware or firmware instructions. Processors of the logic subsystem 82 may be single or multi-core, and the programs executed thereon may be configured for parallel or distributed processing. The logic subsystem 82 may optionally include individual components that are distributed throughout two or more devices, which may be remotely located and/or configured for coordinated processing. For example, the logic subsystem 82 may include several engines for processing and analyzing data. These engines may be wirelessly connected to one or more databases for processing data received from one or more of the vehicles 12. One or more aspects of the logic subsystem 82 may be virtualized and executed by remotely accessible networked computing devices configured in a cloud computing configuration.

Data-holding subsystem 84 may include one or more physical, non-transitory devices configured to hold data and/or instructions executable by the logic subsystem 82 to implement the herein described methods and processes. When such methods and processes are implemented, the state of data-holding subsystem 84 may be transformed (for example, to hold different data).

Data-holding subsystem 84 may include removable media and/or built-in devices. Data-holding subsystem 84 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 84 may include devices with one or more of the following characteristics: volatile, nonvolatile, dynamic, static, read/write, read-only, random access, sequential access, location addressable, file addressable, and content addressable. In some embodiments, logic subsystem 82 and data-holding subsystem 84 may be integrated into one or more common devices, such as an application-specific integrated circuit or a system on a chip.

It is to be appreciated that data-holding subsystem 84 includes one or more physical, non-transitory devices. In contrast, in some embodiments aspects of the instructions described herein may be propagated in a transitory fashion by a pure signal (for example, an electromagnetic signal) that is not held by a physical device for at least a finite duration. Furthermore, data and/or other forms of information pertaining to the present disclosure may be propagated by a pure signal.

Servers 16 may include one or more databases 85 in data-holding subsystem 84 for storing processed requests for assistance, vehicle location data, and vehicle operator preferences.

When included, display subsystem 86 may be used to present a visual representation of data held by data-holding subsystem 84. As the herein described methods and processes change the data held by the data-holding subsystem 84, and thus transform the state of the data-holding subsystem 84, the state of display subsystem 86 may likewise be transformed to visually represent changes in the underlying data. Display subsystem 86 may include one or more display devices utilizing virtually any type of technology. Such display devices may be combined with logic subsystem 82 and/or data-holding subsystem 84 in a shared enclosure, or such display devices may be peripheral display devices.

When included, communication subsystem 88 may be configured to communicatively couple remote servers 16 with one or more other computing devices, such as vehicles 12. Communication subsystem 88 may include wired and/or wireless communication devices compatible with one or more different communication protocols. As non-limiting examples, communication subsystem 88 may be configured for communication via a wireless telephone network, a wireless local area network, a wired local area network, a wireless wide area network, a wired wide area network, etc. In some embodiments, communication subsystem 88 may allow remote servers 16 to send and/or receive messages to and/or from other devices via a network such as the public Internet.

In some examples, the relay towers 70 may be configured as part of a wireless cellular network. In such examples, the communications system 10 may include personal wireless devices 22 which can be, for example, cellular phones or other personal portable devices capable of wireless communication including, for the illustrated embodiment, SMS messaging capability. The devices 22 can communicate with the relay towers 70 to send and receive voice calls, SMS messages, and possibly other communications such as non-speech data for purposes of providing Internet access, weather information, stock information, etc. Further, the telematics unit 30 of each of the vehicles 12 may be capable of sending and/or receiving SMS messages, and phone calls via the cellular network provided by the relay towers 70.

As such, telematics unit 30 may utilize cellular communication according to either GSM or CDMA standards and thus may include a standard cellular chipset for voice communications like hands-free calling.

Further, communications system may include one or more mobile switching centers (MSCs) 72, as well as any other networking components required to connect wireless carrier system 14 with remote servers 16. Each of the relay towers 70 may therefore include sending and receiving antennae and a base station, with the base stations from different cell towers being connected to the MSC 72 either directly or via intermediary equipment such as a base station controller. Wireless carrier system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless carrier systems 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Short message service center (SMSC) 24 is preferably in communication with relay towers 70 and is involved in the communication of SMS messages. SMSC 24 can operate according to a store-and-forward principal; that is, when a first user sends an SMS message that is intended for a second user, the SMS message gets stored at the SMSC until the second user is available to receive it. In other embodiments, the SMSC employs a store-and-forget approach where it only attempts to pass the SMS message along one time. These types of approaches enable users to send and receive SMS messages at any time, even if they are currently on a voice call. It should of course be appreciated that the exemplary representation of SMSC 24 is but one example of a suitable arrangement, as the SMSC could instead be provided according to some other configuration known in the art. In general, SMS messages sent to or from the vehicles 12 or wireless mobile devices 22 are received and/or transmitted by the relay towers 70, and pass through the MSC 72 and SMSC 24 for processing and routing to the remote servers 16.

An example interior of a cabin of one of the vehicles 12 is shown below with reference to FIG. 2.

Figure 2:
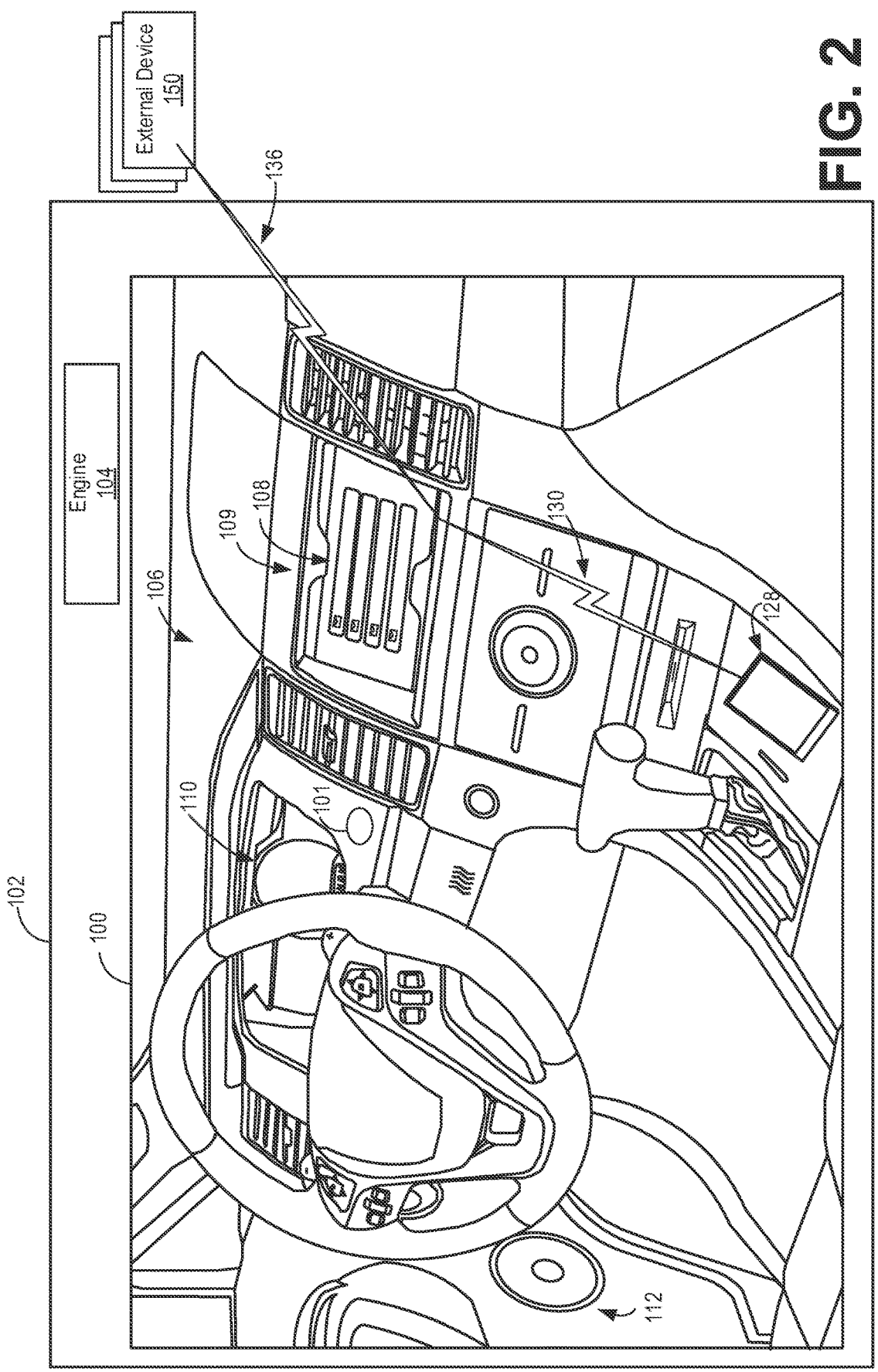
FIG. 2 shows an example partial view of a vehicle cabin in accordance with one or more embodiments of the present disclosure.

FIG. 2 shows an example partial view of one type of environment for a communication system for data synchronization: an interior of a cabin 100 of a vehicle 102, in which a driver and/or one or more passengers may be seated. Vehicle 102 may be the same or similar to vehicles 12 described above with reference to FIG. 1. Vehicle 102 of FIG. 2 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 2 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, navigation system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 3:
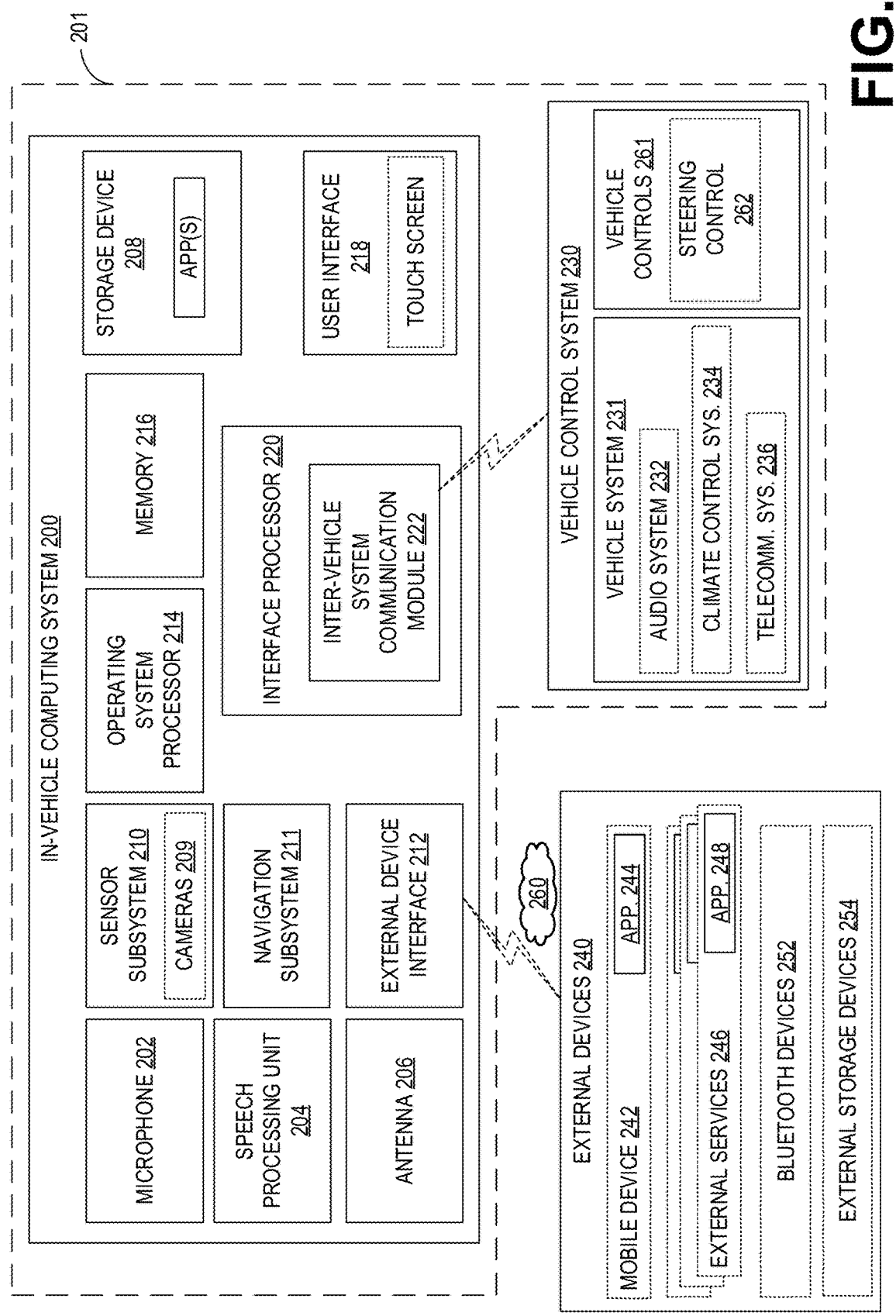
FIG. 3 shows an example in-vehicle computing system in accordance with one or more embodiments of the present disclosure.

FIG. 3 shows a block diagram of an in-vehicle computing system 200 configured and/or integrated inside vehicle 201. In-vehicle computing system 200 may be an example of in-vehicle computing system 109 of FIG. 2 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

The in-vehicle computing system 200 may be configured to detect the occurrence of an accident, impact, or mechanical failure of the vehicle 201 based on input received from the various sensors of vehicle 201. Further, in some examples, a vehicle user, may be able to signal that an impact, accident, mechanical failure, etc., has occurred via user inputs such as buttons, touch screen, etc., of user interface 218.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server (e.g., remote servers 16 shown in FIG. 1). The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. For example, the external storage devices 254 may include servers 16 described above with reference to FIG. 1.

As such, external storage devices 254 may receive requests for assistance from the in-vehicle computing system 200. Operating system processor 214 may determine whether an impact, accident, mechanical and/or electrical failure, occupant medical emergency, of other type of emergency has occurred based on outputs received from the vehicle sensors. Additionally or alternatively, a vehicle driver or passenger may communicate a need for assistance to the operating system processor 214 via the user interface 218. In response to a determination that an impact, accident, mechanical failure, or other emergency has occurred the operating system processor 214 may transmit a request for assistance to the external storage devices 254.

The external storage devices 254 may process the request and determine the desired recipients of the assistance request. In some embodiments, the storage devices 254 may transmit the assistance request to vehicle located in the same geographic area, or within a threshold distance of the vehicle from which the assistance request was received so that nearby vehicles may assist the vehicle. Further, the storage devices 254 may contact external services 246 such as ambulances, tow trucks, police, etc., to provide the desired assistance to the vehicle.

External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct, as described in more detail below.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennae in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennae 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 2, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

It should be appreciated that the telematics unit 30 as described hereinabove with regard to FIG. 1 may be formed from multiple components of the in-vehicle computing system 200, including but not limited to the antenna 206 and the external device interface 212. Further, the antenna 56 of the telematics unit 30 may comprise at least a primary antenna and a backup antenna contained within the telematics unit 30.

Figure 4:
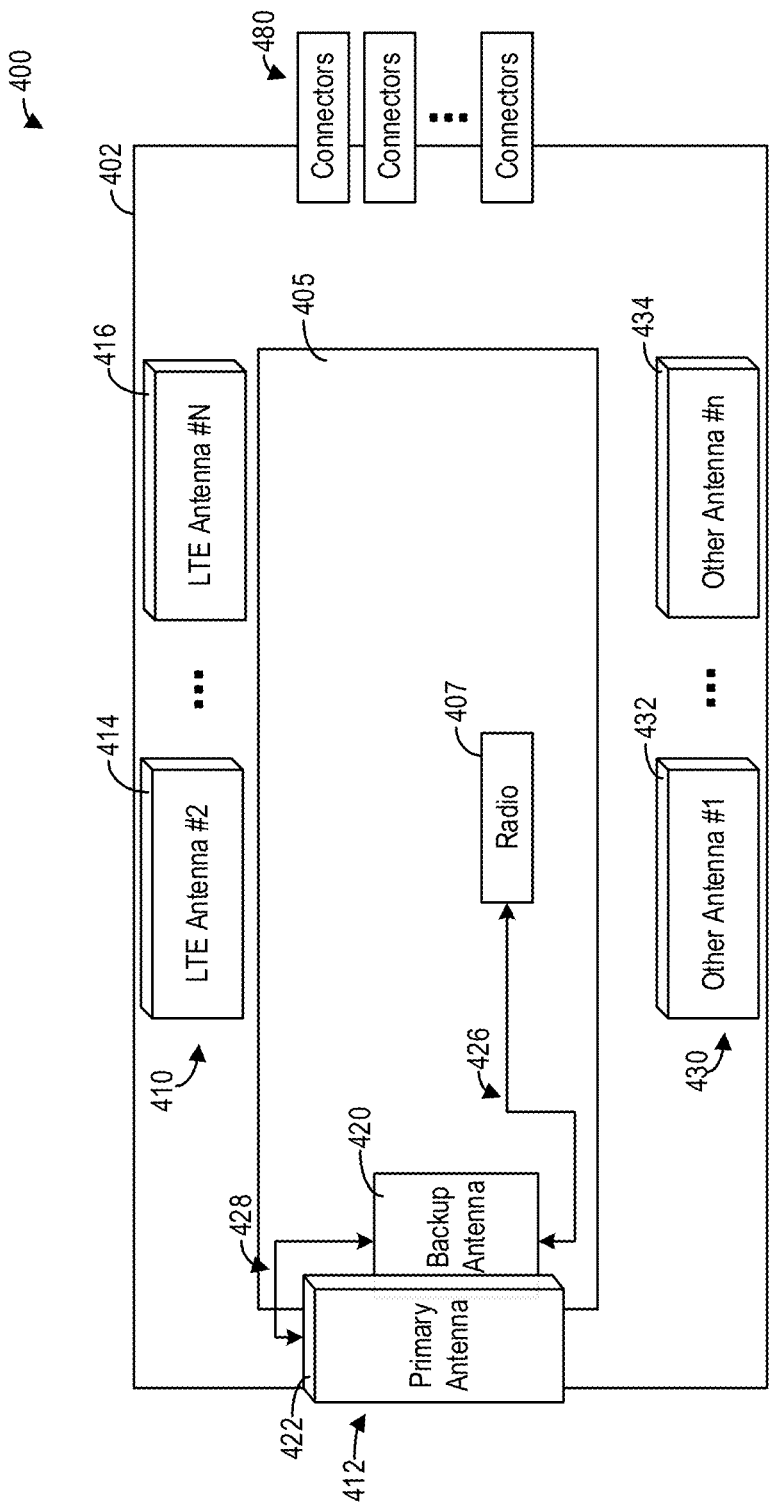
FIG. 4 shows a block diagram depicting an example telematics unit with a primary antenna and a backup antenna in accordance with one or more embodiments of the present disclosure.

As an illustrative example, FIG. 4 shows a block diagram depicting an example telematics unit 400 with a primary antenna 422 and a backup antenna 420 in accordance with one or more embodiments of the present disclosure. The telematics unit 400 may be implemented as the telematics unit 30 in a vehicle 12, for example. The telematics unit 400 comprises a plurality of hardware components housed within a housing 402, such as a printed circuit board (PCB) 405 for mechanically supporting and electrically connecting electronic components of the telematics unit 400, such as a radio 407. Further, though not depicted in FIG. 4, the PCB 405 may further support the wireless modem 50, the electronic processing device 52, and the one or more digital memory devices 54 described hereinabove with regard to FIG. 1. The telematics unit 400 further includes a plurality of connectors 480 for coupling the telematics unit 400 to other elements or components of an in-vehicle computing system such as the in-vehicle computing system 200.

The telematics unit 400 further includes a plurality of antennae 410 for providing a communication link to a wireless carrier system (e.g., including a base station of a relay tower), for example, in order to provide 4G/LTE or 5G service as illustrative examples. The plurality of antennae 410 may include a number N of antennae, including a first antenna 412, a second antenna 414, and so on, up to an Nth antenna 416. Each antenna of the plurality of antennae 410 may comprise a 5G or LTE antenna, as an illustrative example.

The telematics unit 400 may further include other types of antenna, depicted in FIG. 4 as a second plurality of antennae 430, for supporting the transmission and reception of wireless signals according to different protocols. The second plurality of antennae 430 may include n antennae, including a first antenna 432 and up to an nth antenna 434.

At least one antenna 412 of the plurality of antenna 410 comprises a primary antenna 422 and a backup antenna 420. The backup antenna 420 comprises a two-dimensional antenna integrated into or printed onto the PCB 405. As an illustrative and non-limiting example, the backup antenna 420 may comprise an inverted-F antenna such as a printed inverted-F antenna or a planar inverted-F antenna (PIFA). The backup antenna 420 may be configured such that the backup antenna 420 can at least fulfill the function of transmitting an emergency call or e-call. The backup antenna 420 is connected via a first connection 426 to the radio 407, for example. The first connection 426 may comprise an electrical connection or transmission line integrated into the PCB 405, for example.

The primary antenna 422 comprises a three-dimensional antenna mounted to the PCB 405 at the backup antenna 420, such that the primary antenna 422 and the backup antenna 420 effectively share a same physical space. Further, the primary antenna 422 in combination with the backup antenna 420 form the first antenna 412. The primary antenna 422 is electrically coupled to the backup antenna 420 via a second connection 428. The second connection 428 may comprise, for example, a spring-loaded contact.

When accidents such as a vehicle crash or impact occur, the telematics unit 400 may be damaged. In such instances, the housing 402 is the first element of the telematics unit 400 to sustain damage. The components housed within the housing 402 are subject to different damage risks depending on the severity of the crash and the scales of the external forces on the telematics unit 400. In order to achieve the best transmission performance, the antennae of the plurality of antennae 410 and the plurality of antennae 430 are positioned as close to the inner surface of the housing 402 in order to maximize the distance from the components of the PCB 405 which may be positioned in a relatively central region of the telematics unit 400. Consequently, components closer to the inner surface of the housing 402, for example such as the three-dimensional antennae of the plurality of antennae 410 and the plurality of antennae 430, are at a higher risk of damage in comparison to components relatively positioned in a central area of the telematics unit 400, such as the PCB 405.

According to the design of the first antenna 412, if the primary antenna 422 is damaged due to vehicle collision or another accident such that the primary antenna 422 is non-functional or the second connection 428 is broken, the backup antenna 420 may still be capable of transmitting an emergency call to a nearby wireless carrier system (e.g., wireless carrier system 14), for example, or to another vehicle 12 as described hereinabove with regard to FIG. 1.

Figure 5:
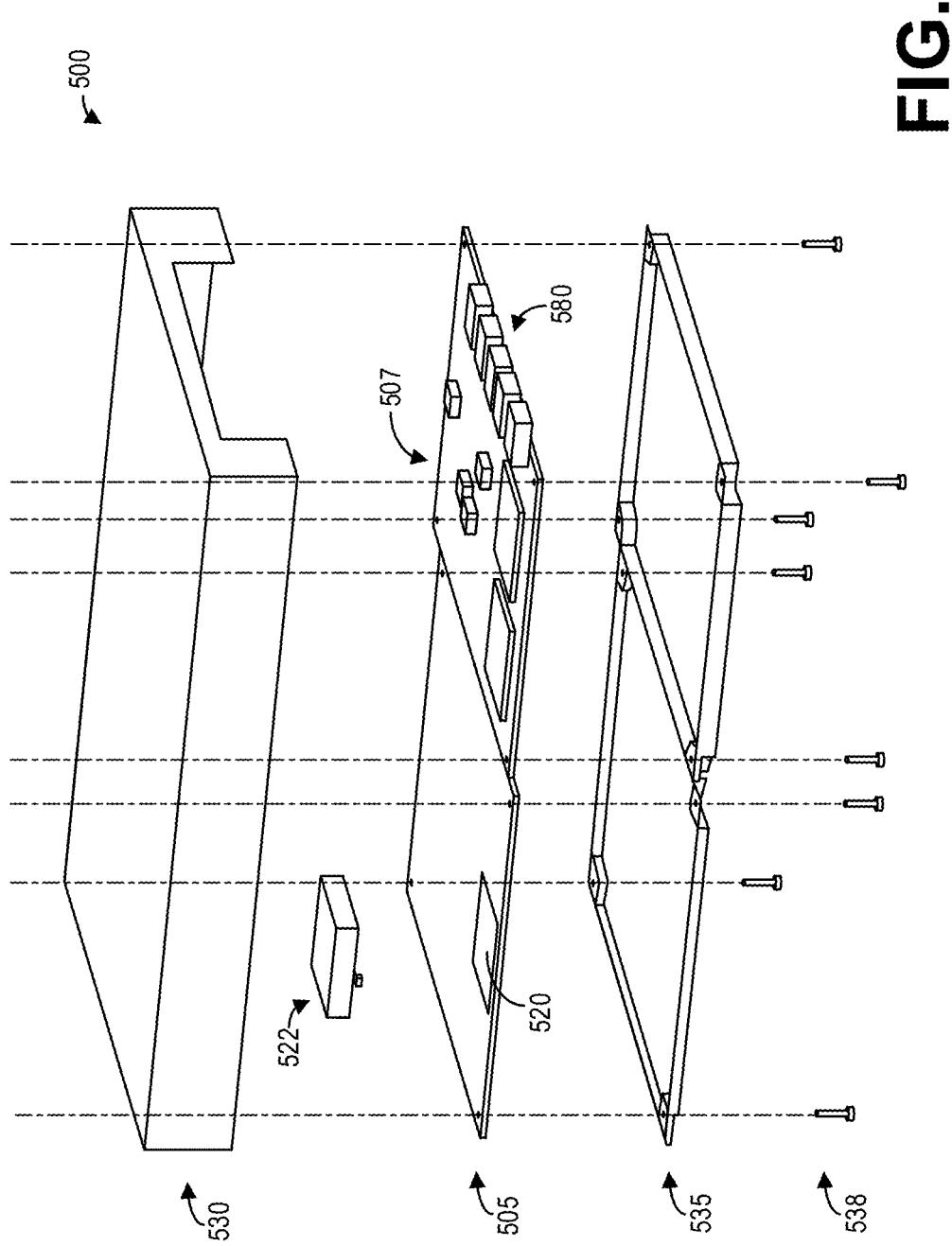
FIG. 5 shows an exploded view of an example telematics unit with a primary antenna and a backup antenna in accordance with one or more embodiments of the present disclosure.

As another illustrative example, FIG. 5 shows an exploded view of an example telematics unit 500 with a primary antenna 522 and a backup antenna 520 in accordance with one or more embodiments of the present disclosure. The telematics unit 500 may comprise the telematics unit 400 described hereinabove with regard to FIG. 4, and may be implemented in a vehicle 12 as the telematics unit 30 described hereinabove with regard to FIG. 1.

Similar to the telematics unit 400, the telematics unit 500 comprises a PCB 505 which includes circuit components 507 such as the radio 407 and other electrical components, as well as a plurality of connectors 580 for coupling the telematics unit 500 to an in-vehicle computing system such as the in-vehicle computing system 200. The backup antenna 520 is printed onto or otherwise integrated into the PCB 505 as a two-dimensional antenna, as depicted, while the primary antenna 522 comprises a three-dimensional antenna positioned above the backup antenna 520.

The telematics unit 500 further includes a top cover 530 and a bottom cover 535 which, when coupled together via a plurality of screws 538, enclose the PCB 505, the primary antenna 522, the secondary antenna 520, and the circuit components 507 of the telematics unit 500. The top cover 530 and the bottom cover 535 thus form a housing such as the housing 402. Although not depicted in FIG. 5, it should be appreciated that one or more additional antennae, such as the additional antennae of the plurality of antennae 510 or the plurality of antennae 530 mentioned hereinabove, may be fixedly coupled to an inner surface of the top cover 530 along one or more edges of the top cover 530 such that the one or more additional antennae are positioned away from the circuit components 507 of the PCB 505.

Figure 6:
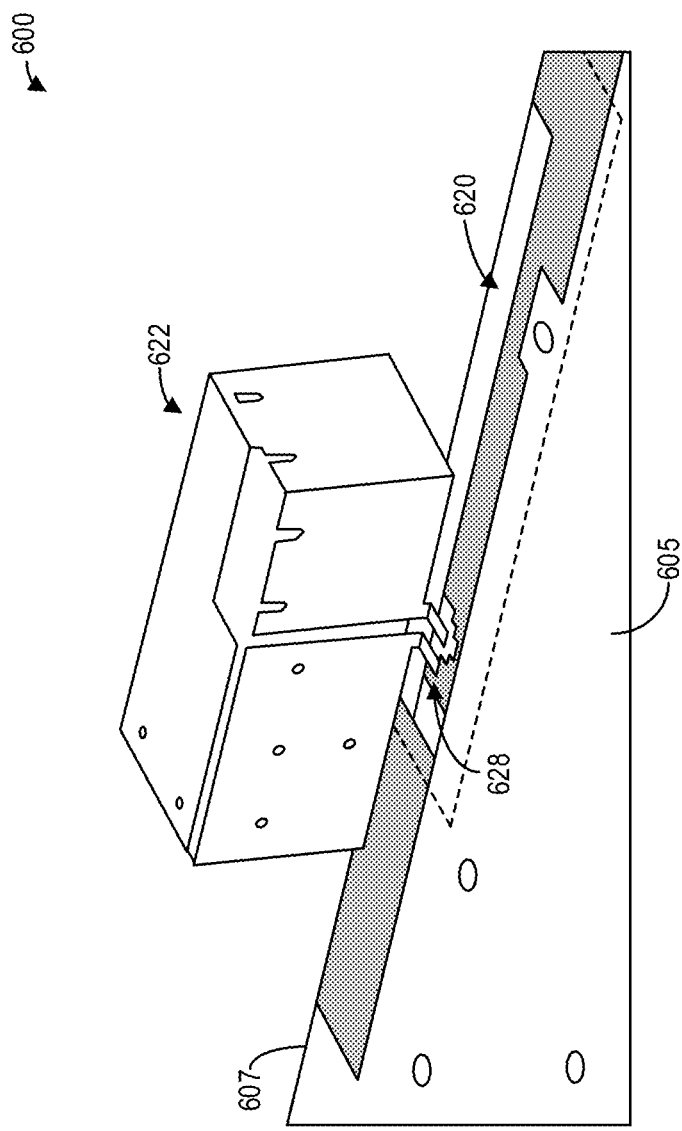
FIG. 6 shows a perspective view of an example antenna system including a three-dimensional primary antenna and a two-dimensional backup antenna in accordance with one or more embodiments of the present disclosure.

Further, while the primary antenna 522 is depicted as being positioned substantially above or over the backup antenna 520 in FIG. 5, it should be appreciated that the primary antenna 522 may only partially cover the backup antenna 520. As an illustrative example, FIG. 6 shows a perspective view of an example antenna system 600 including a three-dimensional primary antenna 622 and a two-dimensional backup antenna 620 in accordance with one or more embodiments of the present disclosure. The antenna system 600 may correspond to the first antenna 412 comprising the primary antenna 422 and the backup antenna 420 described hereinabove with regard to FIG. 4, as well as the primary antenna 522 and the backup antenna 520 described hereinabove with regard to FIG. 5.

As depicted, the backup antenna 620 comprises a two-dimensional antenna printed onto or integrated into a PCB 605 of a telematics unit, while the primary antenna 622 comprises a three-dimensional antenna. The primary antenna 622 is electrically coupled to the backup antenna 620 via a connection 628 which may comprise a spring-loaded contact, for example. Further, while a portion of the primary antenna 622 is positioned over the secondary antenna 620, the remainder of the primary antenna 622 is positioned away from the edge 607 of the PCB 605.

In this way, a telematics system for an on-road vehicle comprises a plurality of antennae capable of sending and receiving wireless signals, the plurality of antennae including a primary antenna and a backup antenna positioned adjacent to the primary antenna. In a first example of the telematics system, the primary antenna comprises a three-dimensional antenna, and the backup antenna comprises a two-dimensional antenna. In a second example of the telematics system optionally including the first example, the telematics system further comprises a printed circuit board supporting circuitry of the telematics system, wherein the backup antenna is integrated into the printed circuit board. In a third example of the telematics system optionally including one or more of the first and second examples, the primary antenna is positioned over a portion of the backup antenna. In a fourth example of the telematics system optionally including one or more of the first through third examples, the backup antenna is positioned at an edge of the printed circuit board, and the primary antenna extends away from the edge of the printed circuit board. In a fifth example of the telematics system optionally including one or more of the first through fourth examples, the backup antenna is printed onto a surface of the printed circuit board. In some examples, the backup antenna comprises a printed inverted-F antenna, though it should be appreciated that the backup antenna may comprise another antenna type such as an inverted-L antenna or a loop-type antenna. In a sixth example of the telematics system optionally including one or more of the first through fifth examples, the primary antenna is electrically coupled to the backup antenna via a spring-loaded contact. In a seventh example of the telematics system optionally including one or more of the first through sixth examples, the telematics system further comprises a processor and a storage device storing instructions executable by the processor to: generate an emergency alert responsive to detecting alert conditions; determine whether the primary antenna is functional; transmit the emergency alert via the primary antenna and the backup antenna if the primary antenna is functional; and transmit the emergency alert via the backup antenna if the primary antenna is not functional. In an eighth example of the telematics system optionally including one or more of the first through seventh examples, the primary antenna is determined as not functional if a connection between the primary antenna and the backup antenna is damaged. In a ninth example of the telematics system optionally including one or more of the first through eighth examples, the emergency alert comprises a package of data encoding one or more of a geographical location of the vehicle, road conditions, vehicle operator information, vehicle make, vehicle model, and vehicle year. In a tenth example of the telematics system optionally including one or more of the first through ninth examples, the telematics system further comprises a housing configured to enclose the plurality of antennae, the processor, and the storage device.

Figure 7:
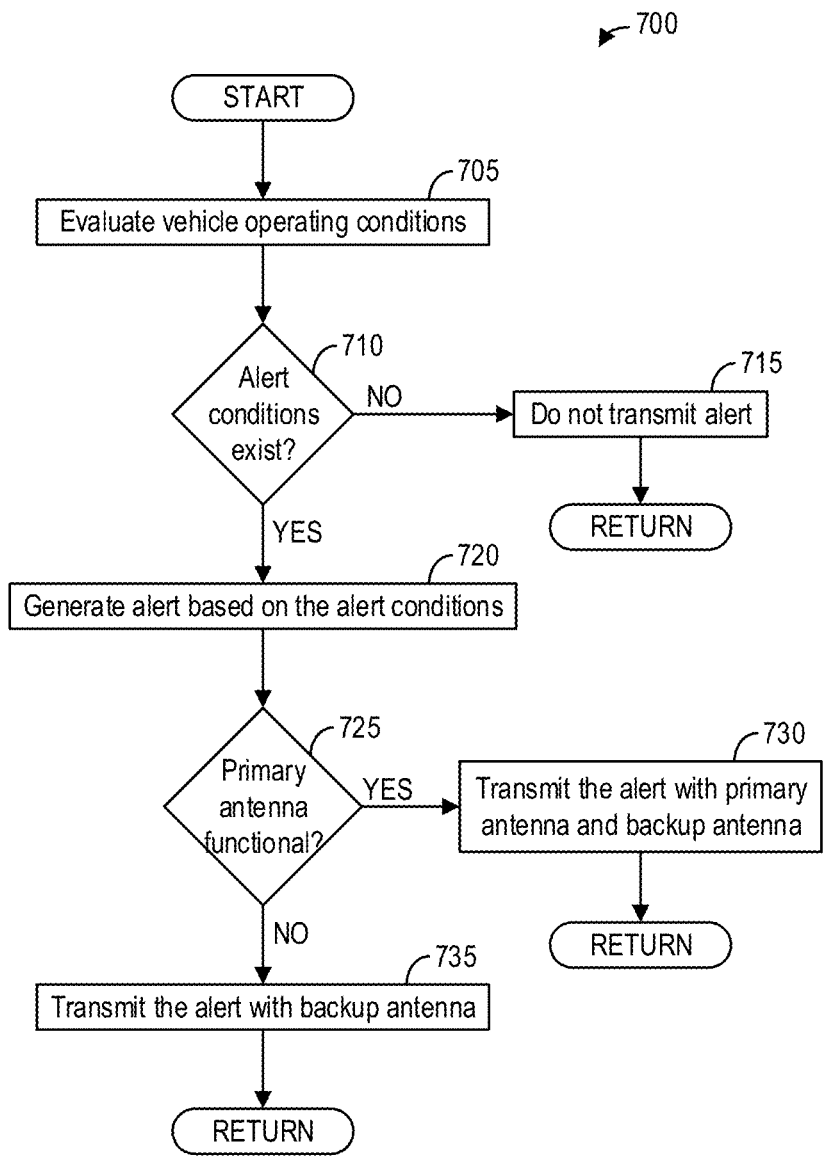
FIG. 7 shows a high-level flow chart illustrating an example method for transmitting alerts with a telematics unit in accordance with one or more embodiments of the present disclosure.

FIG. 7 shows a high-level flow chart illustrating an example method 700 for transmitting alerts with a telematics unit in accordance with one or more embodiments of the present disclosure. In particular, method 700 relates to transmitting alerts with a telematics unit, such as the telematics unit 30, which may be implemented in a vehicle 12 with a primary antenna and a secondary antenna housed within the telematics unit, as depicted in the various examples of FIGS. 4-6. Instructions for carrying out method 700 may be stored in non-transitory memory of a vehicle controller (e.g., operating system processor 214 shown in FIG. 3) or a processor of a telematics unit (e.g., processor 52 of the telematics unit 30 shown in FIG. 1). As such, method 700 may be executed by the processor based on the stored instructions and in conjunction with signals received from sensors of the vehicle system such as the sensors described hereinabove with reference to FIGS. 2 and 3. The processor may employ an antenna system comprising a primary antenna and a backup antenna, such as the antenna system depicted in FIGS. 4-6, to transmit an alert responsive to alert conditions.

Method 700 begins at 705. At 705, method 700 evaluates vehicle operating conditions. Evaluating vehicle operating conditions comprises estimating and/or measuring vehicle operating conditions. Vehicle operating conditions may include ambient temperature, humidity, precipitation, road surface conditions, proximity to external objects, deformation of the body of the vehicle in instances of an impact, engine speed, vehicle electrical and mechanical conditions, and vehicle brake conditions, air bag deployment, vehicle occupant medical conditions, vehicle acceleration, impact force, and so on.

At 710, method 700 determines whether alert conditions exist. Alert conditions may be determined by the controller based on outputs received from various sensors of the vehicle. For example, alert conditions may include vehicle impacts, accidents, mechanical and/or electrical failures, and so on. Vehicle impacts may be detected based on an amount of deformation of the body of the vehicle as estimated from various electronic acceleration sensors. However, in other examples, alert conditions may include road and/or traffic conditions such as road construction, inclement weather, environmental conditions, attempt of theft/vandalism, riots, and so on. A vehicle operator may generate an alert via inputs on a user interface (e.g., user interface 218 shown in FIG. 3) which may include various buttons (e.g., pushbuttons 34 shown in FIG. 1), touch screen (e.g., touch screen 108 shown in FIG. 2), or another input device.

If alert conditions do not exist ("NO"), method 700 continues to 715. At 715, method 700 does not transmit an alert. Method 700 then returns. Thus, in the absence of alert conditions, method 700 does not transmit an alert.

However, referring again to 710, if alert conditions exist ("YES"), then method 700 continues from 710 to 720. At 720, method 700 generates an alert based on the alert conditions identified at 710. In some examples, the alert may comprise an assistance request. An assistance request may be a message, alert, or other form of notification that may include text, voice, audio, video, or other form of digital information that may notify other vehicles of a vehicle in need of their assistance. For example, an assistance request may be broadcast in response to an impact, accident, mechanical failure, electrical failure, or medical emergency of an operator or passenger of a vehicle. The assistance request may include the geographical coordinates or location of the vehicle broadcasting the assistance request, so that nearby vehicles may assist the vehicle. Further, the assistance request may include details regarding the reason for the request, type of request, time, importance, severity, and so on. In some examples, services such as ambulances, tow trucks, police, and so on, may be notified of the location of the vehicle requesting assistance, so that they may provide assistance.

Further, profile information, such as information about one or more of the vehicle occupants and/or information about the vehicle may be stored in non-transitory memory of the controller and may be included in the alert. For example, a vehicle occupant may store their profile information in the non-transitory memory of the controller via input devices such as the display screen, buttons, etc. The profile information may include one or more of the name, age, gender, medical conditions, and so on, of the vehicle occupant. Further, the profile information may include one or more of the make, model, year, and so on, of the vehicle. Thus, the alert may include any or all of the profile information of the vehicle occupant and/or of the transmitting vehicle.

The alert may be generated based on desired or intended recipients of the alert. In some examples, the desired recipients may be all vehicles within the range of the wireless transmission of the communications system. The range of the communications system may in some examples be approximately 1 kilometer, or may extend anywhere from 0.5 kilometers to four kilometers. Thus, all vehicles equipped with a communications system capable of receiving wireless signals (e.g., electromagnetic waves), and in the transmission range of the communications system may receive the alert.

However, in other examples, the alert may only be sent to a subset of vehicles within the transmission range of the communications system. In still further examples, the desired recipients may include medical services, tow services, mechanics, taxi services, and so on, in addition to vehicles within the transmission range of the communications system. For example, if a mechanical failure occurs, then the alert may be transmitted to a car repair shop or mechanic. In the event of a medical emergency of one of the passengers and/or driver of the vehicle, an alert may be sent to an ambulance. Thus depending on the nature of the alert, one or more third party services may be notified of the alert of the vehicle.

After generating the alert at 720, method 700 continues to 725. At 720, method 700 determines whether the primary antenna is functional for transmitting the alert. The primary antenna, such as the primary antenna 422, is functional if the connection between the primary antenna and the backup antenna (e.g., the second connection 428 between the primary antenna 422 and the backup antenna 420) is unbroken and the primary antenna is undamaged. The primary antenna may be damaged and/or disconnected from the backup antenna during impact, for example, and so may be non-functional in some instances.

If the primary antenna is functional ("YES"), method 700 continues to 730. At 730, method 700 transmits the alert with the primary antenna and the backup antenna. Depending on the type of the alert, method 700 may transmit the alert, via the primary antenna and the backup antenna, to one or more of another vehicle in the same or similar geographic area, and one or more remote servers. In some examples, the alert may be transmitted via a preferred electromagnetic wave frequency and/or intensity directly from the vehicle, via the primary and backup antennae, to the remote servers. However, in other examples, one or more relay towers (e.g., relay towers 70 shown in FIG. 1) may propagate the alert from the vehicle to the remote servers. As an example, to transmit the alert via the primary and backup antennae, method 700 may transmit wireless signals encoding packets of data corresponding to one or more of the alert type, severity of the alert, vehicle operator information and/or vehicle information from the vehicle transmitting the alert, location of the vehicle, vehicle operating conditions such as engine speed, vehicle speed, vehicle acceleration, impact force, vehicle body deformation, air bag deployment, and so on. After transmitting the alert via the primary and backup antennae, method 700 then returns.

However, referring again to 725, if the primary antenna is not functional ("NO"), method 700 continues to 735. At 735, method 700 transmits the alert with the backup antenna. The alert may comprise the alert generated at 720, for example, or may comprise a modified alert or a simplified alert suitable for transmission via the backup antenna. Method 700 then returns.

In this way, a method for a telematics system for a vehicle comprises generating an emergency alert responsive to detecting alert conditions, determining whether a primary antenna of the telematics system is functional, transmitting the emergency alert via the primary antenna and a backup antenna of the telematics system positioned adjacent to the primary antenna if the primary antenna is functional, and transmitting the emergency alert via the backup antenna if the primary antenna is not functional. In a first example of the method, the primary antenna comprises a three-dimensional antenna and the backup antenna comprises a two-dimensional antenna integrated into a printed circuit board of the telematics system, wherein the primary antenna and the secondary antenna are electrically coupled via a connection, and wherein transmitting the emergency alert via the primary antenna and the backup antenna comprises routing the emergency alert from a processor of the telematics system to the backup antenna via a transmission line of the printed circuit board. In a second example of the method optionally including the first example, the emergency alert is transmitted via the backup antenna when the connection between the primary antenna and the secondary antenna is damaged. In a third example of the method optionally including one or more of the first and second examples, the alert conditions include a vehicle impact, and wherein the emergency alert comprises a package of data encoding one or more of a geographical location of the vehicle, road conditions, vehicle operator information, vehicle make, vehicle model, and vehicle year.

In another embodiment, a telematics system for a vehicle comprises an antenna system comprising a three-dimensional primary antenna and a two-dimensional backup antenna positioned adjacent to the primary antenna, the antenna system capable of wirelessly sending and receiving data packets in accordance with a cellular communication protocol. The telematics system further comprises a processor communicatively coupled to the antenna system, and a storage device storing instructions executable by the processor to: generate an emergency alert responsive to detecting alert conditions; determine whether the primary antenna is functional; transmit the emergency alert via the primary antenna and the backup antenna if the primary antenna is functional; and transmit the emergency alert via the backup antenna if the primary antenna is not functional. In a first example of the telematics system, the telematics system further comprises a printed circuit board, wherein the backup antenna is integrated into the printed circuit board, wherein the processor and the storage device are mechanically supported by the printed circuit board, and wherein the processor is communicatively coupled to the backup antenna via a transmission line of the printed circuit board. In a second example of the telematics system optionally including the first example, the primary antenna is positioned over a portion of the backup antenna. In a third example of the telematics system optionally including one or more of the first and second examples, the backup antenna is positioned at an edge of the printed circuit board, and the primary antenna extends away from the edge of the printed circuit board. In a fourth example of the telematics system optionally including one or more of the first through third examples, the telematics system further comprises a housing configured to enclose the plurality of antennae, the processor, and the storage device.

In this way, in the event of an impact, accident, mechanical failure, electrical failure, or medical emergency, an assistance request may be broadcast to nearby vehicles or emergency services, via wireless carrier systems, to notify them of a need for assistance. The assistance request may include the geographical coordinates or location of the vehicle broadcasting the assistance request, so that nearby vehicles or emergency services may travel to and/or assist the vehicle. In some examples, services such as ambulances, tow trucks, police, and so on, may be notified of the location of the vehicle requesting assistance, so that they may provide assistance.

Thus, a technical effect of improving vehicle communication is achieved by providing transceivers in one or more vehicles with primary and backup antennae integrated into the transceiver for supporting the communication. By improving inter-vehicle communication as described herein, in the event of an impact or accident where a vehicle telematics unit is damaged, an emergency alert or call may be automatically transmitted to nearby wireless carrier systems so that emergency services may be alerted and guided to the site of the crash, accident, or medical emergency.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the telematics unit 30 described with reference to FIG. 1. The methods may be performed by executing stored instructions with one or more logic devices (e.g., processors) in combination with one or more additional hardware elements, such as storage devices, memory, hardware network interfaces/antennae, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and subcombinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A telematics system for an on-road vehicle, the telematics system comprising:
   a plurality of antennae capable of sending and receiving wireless signals, the plurality of antennae including a primary antenna and a backup antenna positioned adjacent to the primary antenna, and the backup antenna being configured to transmit a signal when the primary antenna is damaged; and
   a printed circuit board supporting circuitry of the telematics system,
   wherein a portion of the primary antenna is positioned over a portion of the backup antenna, and a remainder of the primary antenna is positioned away from an edge of the printed circuit board.

2. The telematics system of claim 1, wherein the primary antenna comprises a three-dimensional antenna, and wherein the backup antenna comprises a two-dimensional antenna.

3. The telematics system of claim 2, wherein the backup antenna is integrated into the printed circuit board.

4. The telematics system of claim 1, wherein the backup antenna is positioned at an edge of the printed circuit board.

5. The telematics system of claim 3, wherein the backup antenna is printed onto a surface of the printed circuit board.

6. The telematics system of claim 1, wherein the primary antenna is electrically coupled to the backup antenna via a spring-loaded contact.

7. The telematics system of claim 1, further comprising a processor and a storage device storing instructions executable by the processor to:
   generate an emergency alert responsive to detecting alert conditions;
   determine whether the primary antenna is functional;

transmit the emergency alert via the primary antenna and the backup antenna if the primary antenna is functional; and transmit the emergency alert via the backup antenna if the primary antenna is not functional.

8. The telematics system of claim 7, wherein the primary antenna is determined as not functional if a connection between the primary antenna and the backup antenna is damaged.

9. The telematics system of claim 7, wherein the emergency alert comprises a package of data encoding one or more of a geographical location of the vehicle, road conditions, vehicle operator information, vehicle make, vehicle model, and vehicle year.

10. The telematics system of claim 7, further comprising a housing configured to enclose the plurality of antennae, the processor, and the storage device.

11. The telematics system of claim 1, further comprising a housing configured to enclose the plurality of antennae, a processor, and a storage device, wherein the primary antenna is positioned closer to an inner surface of the housing than the backup antenna.

12. The telematics system of claim 1, wherein the primary antenna and the backup antenna are electrically coupled via a connection, and wherein the connection comprises a spring-loaded contact and extends between the primary antenna and the backup antenna.

13. A method for a telematics system for a vehicle, the method comprising:
   generating an emergency alert responsive to detecting alert conditions;
   determining whether a primary antenna of the telematics system is functional;
   transmitting the emergency alert via the primary antenna and a backup antenna of the telematics system positioned adjacent to the primary antenna if the primary antenna is functional; and
   transmitting the emergency alert via the backup antenna if the primary antenna is not functional,
   wherein the backup antenna comprises a two-dimensional antenna integrated into a printed circuit board of the telematics system,
   wherein the primary antenna is positioned over a portion of the backup antenna,
   wherein the primary antenna and the backup antenna are electrically coupled via a connection that comprises a spring-loaded contact, and
   wherein the connection extends between the primary antenna and the backup antenna.

14. The method of claim 13, wherein the primary antenna comprises a three-dimensional antenna, and wherein transmitting the emergency alert via the primary antenna and the backup antenna comprises routing the emergency alert from a processor of the telematics system to the backup antenna via a transmission line of the printed circuit board.

15. The method of claim 14, wherein the emergency alert is transmitted via the backup antenna when the connection between the primary antenna and the backup antenna is damaged.

16. The method of claim 13, wherein the alert conditions include a vehicle impact, and wherein the emergency alert comprises a package of data encoding one or more of a geographical location of the vehicle, road conditions, vehicle operator information, vehicle make, vehicle model, and vehicle year.

17. A telematics system for a vehicle, the system comprising:
   an antenna system comprising a three-dimensional primary antenna and a two-dimensional backup antenna positioned adjacent to the primary antenna, the antenna system capable of wirelessly sending and receiving data packets in accordance with a cellular communication protocol;
   a processor communicatively coupled to the antenna system;
   a storage device storing instructions; and
   a housing configured to enclose the antenna system, the processor, and the storage device,
   wherein the primary antenna is positioned closer to an inner surface of the housing than the backup antenna;
   wherein the instructions are executable by the processor to:
      generate an emergency alert responsive to detecting alert conditions;
      determine whether the primary antenna is functional;
      transmit the emergency alert via the primary antenna and the backup antenna if the primary antenna is functional; and
      transmit the emergency alert via the backup antenna if the primary antenna is not functional.

18. The telematics system of claim 17, further comprising a printed circuit board, wherein the backup antenna is integrated into the printed circuit board, wherein the processor and the storage device are mechanically supported by the printed circuit board, and wherein the processor is communicatively coupled to the backup antenna via a transmission line of the printed circuit board.

19. The telematics system of claim 18, wherein the primary antenna is positioned over a portion of the backup antenna.

20. The telematics system of claim 18, wherein the backup antenna is positioned at an edge of the printed circuit board, and wherein the primary antenna extends away from the edge of the printed circuit board.

* * * * *